(12) United States Patent
Koyama et al.

(10) Patent No.: US 6,406,191 B1
(45) Date of Patent: Jun. 18, 2002

(54) PIVOT ASSEMBLY

(75) Inventors: Toshisada Koyama; Kenichi Goto, both of Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/438,532

(22) Filed: Nov. 12, 1999

(30) Foreign Application Priority Data

Aug. 26, 1999 (JP) ............................................. 11-239642

(51) Int. Cl.[7] ................................................. F16C 19/00
(52) U.S. Cl. ........................................ 384/610; 384/453
(58) Field of Search ............................... 384/453, 610, 384/615, 609, 612

(56) References Cited

U.S. PATENT DOCUMENTS

| | | | |
|---|---|---|---|
| 3,655,226 A | * | 4/1972 | Cowan |
| 3,950,834 A | | 4/1976 | Pitner |
| 4,050,130 A | | 9/1977 | Pitner |
| 5,232,334 A | | 8/1993 | Mechin et al. |
| 5,308,172 A | * | 5/1994 | Upadhya et al. |

FOREIGN PATENT DOCUMENTS

| | | |
|---|---|---|
| CH | 191 908 | 7/1937 |
| DE | 21 25 596 | 12/1972 |
| EP | 0 152 210 | 8/1985 |
| EP | 0 484 209 | 5/1992 |
| FR | 2 231 261 | 12/1974 |
| FR | 2 242 003 | 3/1975 |

* cited by examiner

*Primary Examiner*—Lenard A. Footland
(74) *Attorney, Agent, or Firm*—Oliff & Berridge, PLC

(57) ABSTRACT

The closed end 11b of the Sleeve 11 and the shaft end 12b are made to be point-contacted through the ball 14. By this point contact, while allowing the sleeve 11 and the shaft 12 to rotate, the pressurization in the axial direction between the sleeve and the shaft can be received. Further, by giving this pressurization, the inner ring 13a of the bearing 13 is displaced toward the axial direction (downward in FIG. 1) interposing the ball 13b to absorb the play of the bearing 13. Accordingly, even though merely one bearing 13 is used, the sleeve 11 and the shaft 12 are prevented from being deflected, to obtain the pivot assembly 10 having a necessary rotation precision.

18 Claims, 4 Drawing Sheets

PIVOT ASSEMBLY

BACKGROUND OF THE INVENTION

1. Field of the Invention

This invention relates to a pivot assembly to be used as a bearing miniaturized and in high precision for a spindle motor to drive a disk such as a hard disk driving mechanism.

2. Conventional Art

Since recently a personal computer has been miniaturized rapidly, it is an urgent demand for miniaturizing a hard disk drive mechanism for a magnetic memory device of a computer too. Further, in a hard disk drive mechanism, in order to carry out to write in and read out information precisely, a head as a means for writing in and reading out is necessary to form a mechanism to trace a track of the disc precisely. Accordingly, a head stack assembly to carry out writing in a magnetic disk and reading out from the same is requested to be miniaturized and have a high operation precision.

FIG. 7 shows an inner structure of a hard disc drive mechanism in general. The magnetic disk D is lined up on a rotary axis $C_1$ at a given spacing in plural number, and driven to rotate in a unitary manner by a not shown spindle motor. The head stack assembly (HSA) 1 comprises a head suspension 2 for supporting a magnetic head (not shown) on its tip end and has a structure to pivot an actuator block 3 formed with a suspension support portion 3a for supporting the head suspension 2 by the pivot assembly 4.

The pivot assembly 4 is disposed on a rotary axis $C_2$ parallel with rotary shaft $C_1$ and a shaft 5 is inserted at its central portion. Further, the shaft 5 comprises a sleeve 6 through a bearing. And, since the actuator block 3 is fixed to the sleeve 6, it is possible to make each head suspension 2 swing around the axis $C_2$.

Further, although it is not shown, on an end 3b of the actuator block 3 interposing the rotary axis $C_2$ facing to the head suspension 2, a coil is provided and a magnet is disposed by clamping the coil, which constitutes a so-called voice coil motor. By energizing the voice coil motor, the HSA 1 is swung around the rotary axis $C_2$ to enable to make the magnetic disk D displace to the desired position of the disk D.

FIG. 8 shows the pivot assembly 4 of the HSA 1 in section. The pivot assembly 4 is formed in a unitary manner by interposing two radial ball bearings 7 and 8 between the shaft 5 and the sleeve 6. Further, between the radial ball bearings 7 and 8 an annular spacer 9 is interposed.

Two radial ball bearings 7 and 8 secure the smooth rotation between the shaft 5 and the sleeve 6 and by disposing those at a given spacing those are supported at two points in the axial direction to secure to prevent them from being deflected. Further, the spacer 9 secures the spacing between the radial ball bearing 7 and 8 and is necessary to give both a pressurization. The pressurization gives a pressure the inner ring 7a in the axial direction (lower direction in FIG. 8), and through a ball 7b, an outer ring 7c, a spacer 9, an outer ring 8c, a ball 8b and an inner ring 8a to act on a flange portion 5a of the shaft 5 to which the inner ring 8a abuts to absorb a play of the radial ball bearings 7 and 8.

As mentioned above, the pivot assembly 4 secures the rotary precision of the HSA 1 as a bearing by providing two radial ball bearings 7, 8 and the spacer 9. However, the cost of the radial ball bearings 7 and 8 which occupies the whole cost of the pivot assembly 4 has been very high and become a hindrance of the cost down. In addition, in order to prevent an unevenness of the part precision of the spacer 9 and assembling precision from influencing the rotation precision of the pivot assembly 4, cares should be taken. Further, a laminating structure of two bearing 7, 8 and the spacer 9 make the miniaturization of the pivot assembly 4 become difficult and formed a hindrance against the miniaturization of not only the HSA 1 but also the hard disk drive mechanism.

The present invention has been made in the light of the above problem, the purpose of it is to realize the miniaturization of the pivot assembly, reducing the assembling processes and lowering the cost thereof.

In order to solve the above problem, according to a first aspect of the present invention, a pivot assembly which is formed by interposing bearings between the sleeve and the shaft, a cylindrical portion of the sleeve and the shaft one bearing is disposed and on the end of the shaft a centering means for the shaft and the sleeve is provided.

In the present invention, to the bearing interposed between the cylindrical portion of the sleeve and the cylindrical surface of the shaft, a function to secure primarily the rotation of the sleeve and the shaft is made to have, and to the centering means a function primarily to prevent them from being deflected is made to have.

Further, according to a second aspect of the pivot assembly of the present invention, said centering means is adapted to become a point contact means which is interposed between the end of the shaft and the closed end of the sleeve on the central shafts of the sleeve and the shaft.

By this structure, to the centering means is adapted to have functions to prevent the sleeve and the shaft from being deflected and while allowing the rotation of the sleeve and the shaft to receive the pressurization in the axial direction of the shaft.

Further according to a third aspect of the pivot assembly of the present invention, said centering means comprises recessed portions provided on both of the closed end and the shaft end and balls to be in contact with the recessed portions. By this structure, the closed end of the sleeve and the end of the shaft are made to contact in point through the ball. This point contact is adapted to have a self centering function, since such point contact is generated by the contact between the recessed portions provided on the closed end and the shaft end and the curved surface of the surface of the ball, and said ball is guided by the recessed portion.

Further, according to a fourth aspect of the pivot assembly of the present invention, said pint contact means comprises a recessed portion provided on either one of the closed end or the shaft end and a convex portion formed on the other. By this structure, the closed end of the sleeve and the end of the shaft is made to be contacted in point through the convex portion. This point contact is adapted to have a self centering function, since such point contact is generated by the contact between the recessed portion provided on either one of the closed end and the shaft end and the convex portion of the other, the convex portion is guided by the recessed portion and has a self-centering function.

Further, according to a fifth aspect of the pivot assembly of the present invention, on the closed end coaxially with the shaft an annular projection is provided having an inner diameter a little larger than the shaft diameter. The annular projection has a function for guiding the shaft until the shaft is assembled in the sleeve and makes a point contact each other. In addition, after assembling, by applying lubricant and so on between the shaft and the annular projection the projection will also function as a guide to prevent the shaft from deflection during its rotation.

Further, according to a sixth aspect of the pivot assembly of the present invention, by forming the outer ring of the bearing in a unitary manner with the sleeve, the number of parts can be reduced and the rigidity of the sleeve can be increased due to the thickness increase of the sleeve.

In addition, according to a seventh aspect of the pivot assembly of the present invention, by forming the inner ring of the bearing in a unitary manner with the shaft, the number of parts can be reduced and the rigidity of the shaft can be increased due to the thickness increase of the shaft.

EMBODIMENT

Hereinafter, embodiments of the present invention will be described based on the attached drawings.

Figure 1:
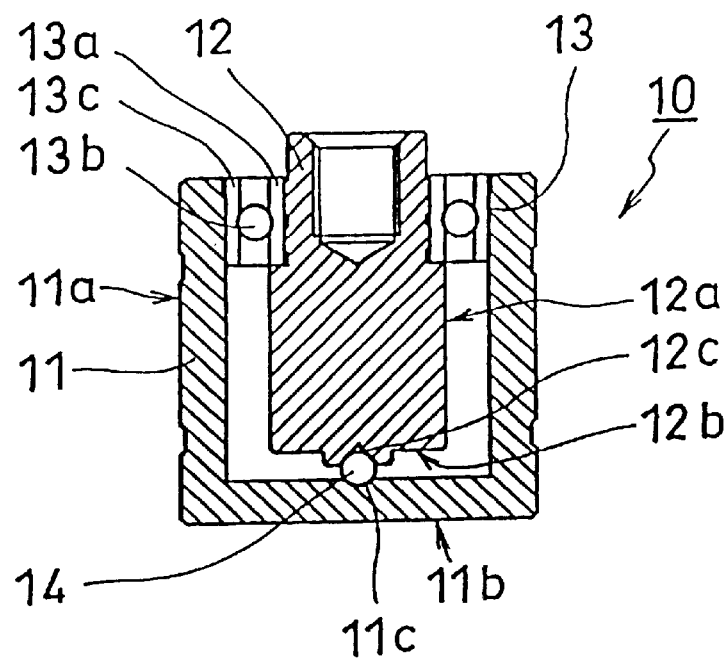
FIG. 1 is a sectional view of the first embodiment of the pivot assembly of the present invention.

FIG. 1 shows the first embodiment of the pivot assembly 10 of the present invention. The pivot assembly 10 is formed by combining the sleeve 11 having a closed end 11b and the shaft 12. And, between the cylinder portion 11a of the sleeve 11 and the cylinder surface 12a of the shaft 12, a radial ball bearing 13 (deep groove ball bearing) is disposed. Further, between the closed end 11b and the shaft end 12b a point contact means is disposed on the central axes of the sleeve 11 and the shaft 12. In this embodiment, such a point contact means comprises the recessed portions 11c, 12c provided on the closed end 11b and the shaft end 12b respectively and the ball 14 which contacts to the recessed portions 11c and 12c.

The operation and effect to be obtained from the first embodiment thus formed is as follows. First, the closed end 11b of the sleeve 11 and the shaft end 12b make a point contact through a ball 14. Since this contact point is generated by the contact between the concave surfaces of the recessed portions 11c, 12c of the closed end 11b and the shaft end 12b and the convex surface of the ball 14, it can receive the axial-direction pressurization between both while allowing the rotation of the sleeve 11 and the shaft 12. Further, by this pressurization the ball 14 is guided by the recessed portions 11c, 12c, which enables the sleeve 11 and the shaft 12 possess a self centering function. Further, by giving such a pressurization, the inner ring 13a of the bearing 13 is deflected through the ball 13b in axial direction (downward in FIG. 1) to the outer ring 13c to absorb the play of the ball bearing 13. For reference, the extent of the pressurization to give to the bearing 13 can be changed free by, for instance, changing the diameter of the ball 14.

Figure 7:
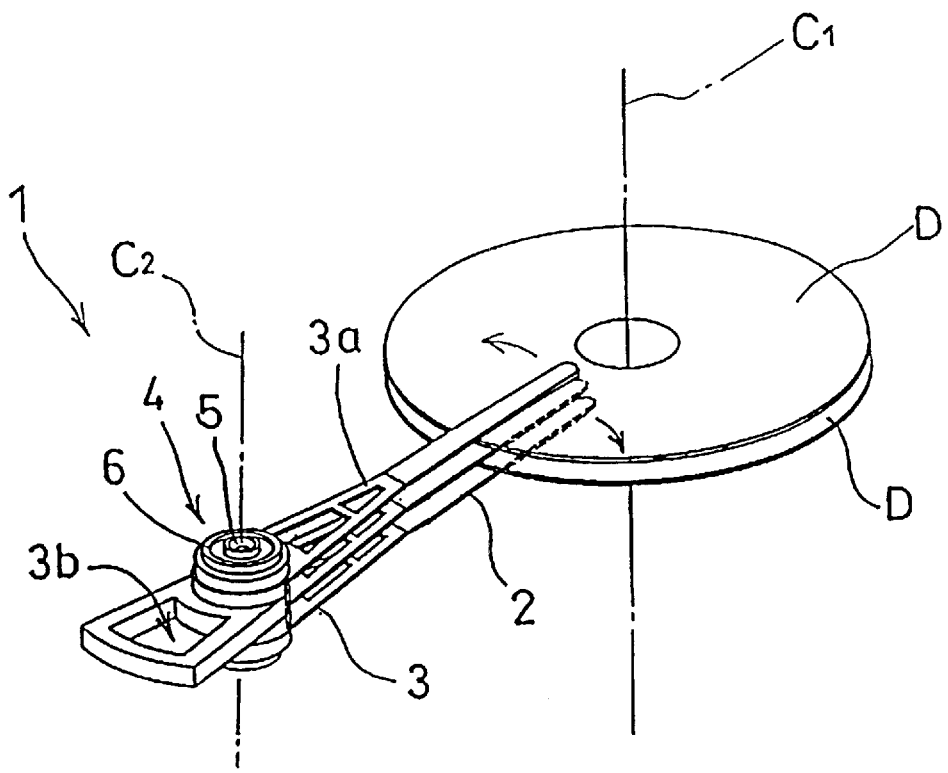
FIG. 7 shows an inner structure of the hard disc drive mechanism in general.
Figure 8:
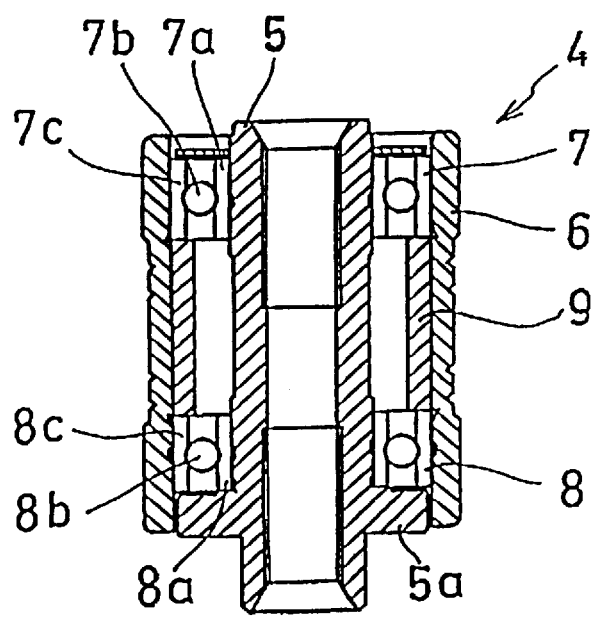
FIG. 8 is a sectional view of the pivot assembly of the hard disk drive assembly shown in FIG. 7.

Accordingly, to the centering means, a function primarily to prevent the sleeve 11 and the shaft 12 from being deflected can be possessed. As a result, the bearing 13 which is disposed between the cylindrical portion 11a of the sleeve 11 and the cylindrical surface 12a of the shaft 12 becomes sufficient to possess a function primarily to secure the rotation of the sleeve 11 and the shaft 12, accordingly, without employing the lamination structure as conventional (as shown in FIG. 8) i.e. two bearings 7, 8 and the spacer 9, by merely one bearing 13, it becomes possible to form the pivot assembly 10 having a rotation precision to be necessary as a bearing for the HSA 1 (FIG. 7).

The cost down due to forming the bearing 13 by single piece can be realized. Further, by getting rid of the conventional spacer 9 (FIG. 8), the reduction of the number of parts is realized and the influence from the unevenness of the part precision of the spacer 9 and the assembling precision is eliminated. And, due to unemployment of the lamination structure of the two bearings and the spacer it becomes possible to accelerate the miniaturization of the pivot assembly 10.

Subsequently, referring to the sectional view of FIG. 2, the pivot assembly 15 according to the second embodiment of the present invention is explained. For reference, identical or equivalent parts with the first embodiment are indicated by the same signs and the explanation is omitted.

The different constitution of the pivot assembly 15 of the second embodiment from the pivot assembly 10 of the first embodiment resides in the annular projection lid positioned coaxially with the shaft 12 and having an inner diameter a little larger than the diameter of the shaft.

The annular projection 11d functions as a guide for the shaft to be assembled in the sleeve 11 until the closed end 11b and the shaft end 12b make a point contact. After assembling, if any lubricant etc. is applied between it and the cylindrical surface 12a of the shaft 12, and also functions as a guide member for rotation to prevent the shaft 12 from being deflected when rotating from the sleeve 11.

From the necessity of making the annular projection 11d possess the above function, "an inner diameter a little larger than the shaft diameter" means the inner diameter which does not prevent the annular projection 11d from becoming a hindrance for functioning as a sliding bearing.

As mentioned above, according to the second embodiment of the present invention, it becomes possible to improve the assembling workability and increase the more improvement of the rotation precision. And, as to the identical effect with the first embodiment, the explanation thereof is omitted.

The different part of the pivot assembly 16 from the pivot assembly 10 of the first embodiment resides in that the point contact means constituted with the recessed portion 11c provided on the closed end of the sleeve 11b and conical-convex portion 11d formed on the shaft end 12b.

Figure 3:
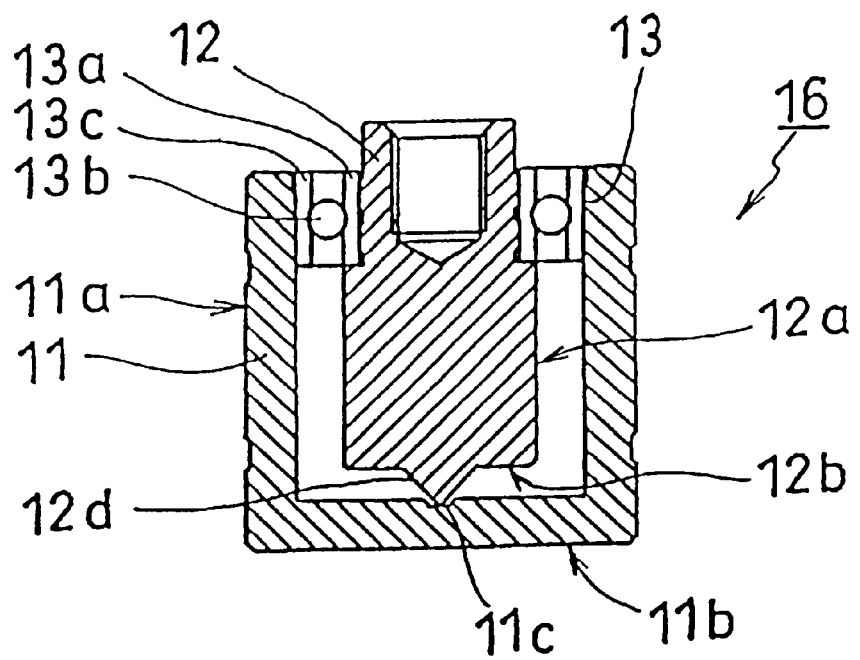
FIG. 3 is a sectional view of the third embodiment of the pivot assembly of the present invention.

By this constitution, the point contact between the closed end 11b of the sleeve 11 and the shaft end 12b is generated by the contact between the surface of the concave portion 11c provided on the closed end 11b and the convex surface of the projection 12d of the shaft end 12b. Now, as shown, if the conical-convex-projection 12d is formed in a unitary manner with the shaft end 12b, it becomes possible to reduce the number of the parts, if it is adapted to be made removable to the shaft end 12b, it becomes easy to regulate free the extent of the pressurization to give the bearing 13. Further, to the contrary to the example of FIG. 3, by providing the conical-convex projection on the closed end 11b of the sleeve 11 and the concave portion on the shaft end 12b too, the identical operation and effects can be obtained. And, as to the operation and the effect identical with the ones of the first embodiment explained in FIG. 1, the explanation thereof is omitted.

Figure 4A:
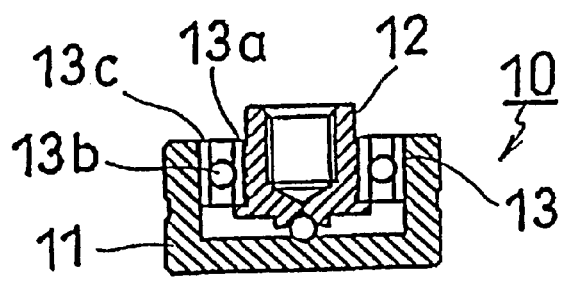
FIGS. 4(a)–4(c) are sectional views showing various application examples of the pivot assembly according to the first embodiment shown in FIG. 1 of the present invention.

Further, FIG. 4 shows an applied example of the pivot assembly 10 of the first embodiment of the present invention explained in FIG. 1. FIG. 4(a) shows an example in which, since the radial ball bearing 13 becomes single piece and the spacer 9 (FIG. 8) becomes unnecessary, the axial length of the pivot assembly 10 is further shortened.

By this shortening, it becomes possible to use it as a bearing for the thin type of hard disk drive mechanism, HSA (FIG. 7) and without deteriorating the function of the thin type of hard disk drive mechanism, to realize a cost down.

Figure 4B:
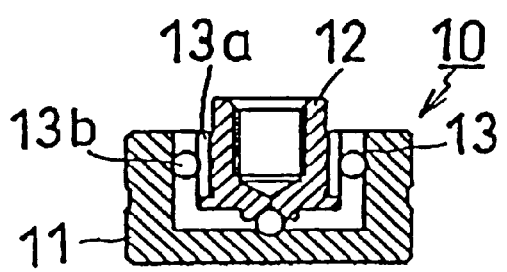
Figure 4C:
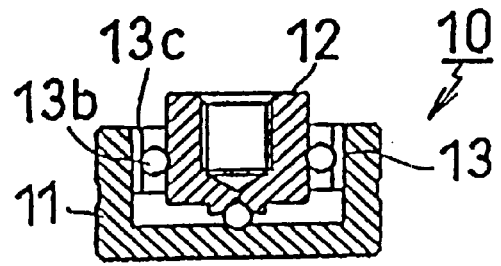

Further, in the example shown in FIG. 4(b), due to forming the outer ring 13c of the bearing 13 in the pivot assembly 10 in a unitary manner with the sleeve 11, without changing the diameter of the shaft 12 and by increasing the thickness of the sleeve 11 the rigidity of the shaft 12 is expected to be increased. In each example shown in FIG. 4(c), it is what tries to increase the thickness of the shaft 12 without changing the inner diameter 13a of the bearing 13 of the pivot assembly 10 shown in FIG. 4(a) by forming it with the shaft 12 in a unitary manner. Each example of FIG. 4(b) and (c) is expected to make a cost down due to reducing the number of parts and a co-vibration frequency tuning due to changing a rigidity balance of components becomes possible.

Figure 2:
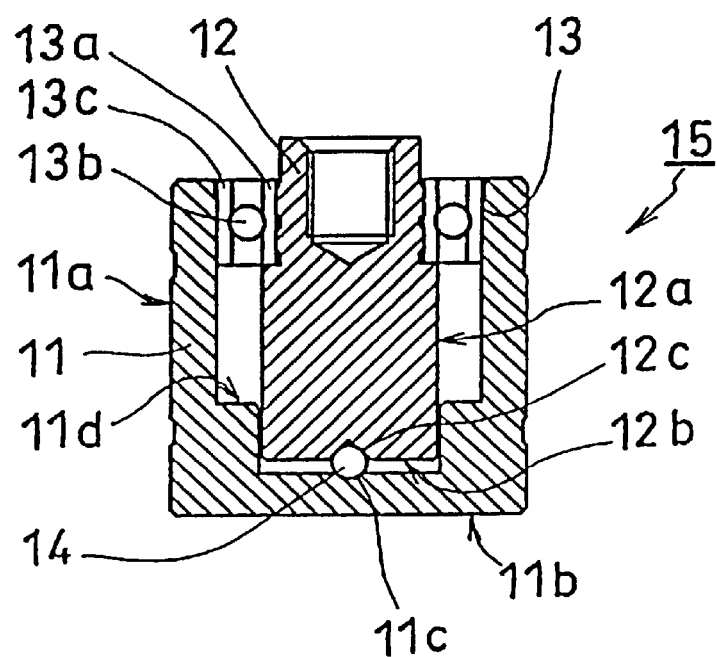
FIG. 2 is a sectional view of the second embodiment of the pivot assembly of the present invention.
Figure 5A:
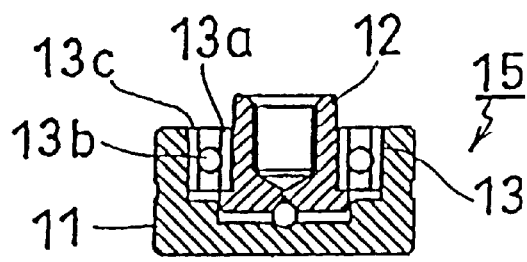
FIGS. 5(a)–5(c) are sectional views showing various application examples of the pivot assembly according to the second embodiment shown in FIG. 2 of the present invention.
Figure 5B:
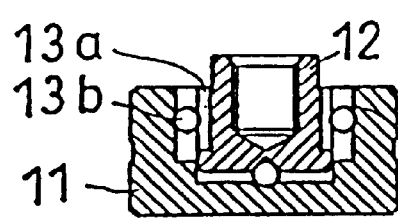
Figure 5C:
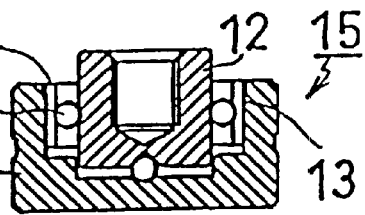
Figure 6A:
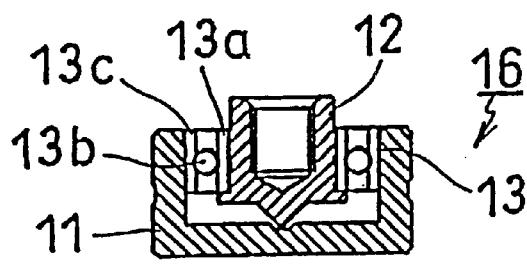
FIGS. 6(a)–6(c) are sectional views showing various application examples of the pivot assembly according to the third embodiment shown in FIG. 3 of the present invention.
Figure 6B:
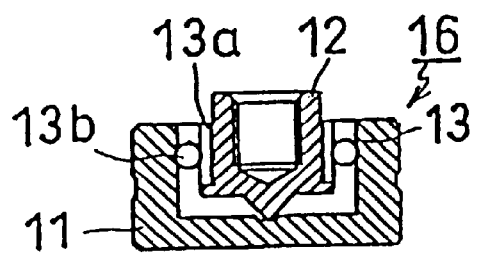
Figure 6C:
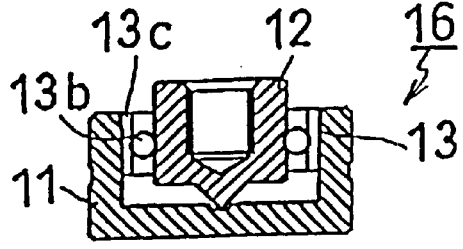

Further, FIGS. 5(a), (b) and (c) show the application examples which are formed by applying changes similar in FIGS. 4(a), (b) and (c) to the pivot assembly 15 of the second embodiment of the present invention shown in FIG. 2. Further, FIGS. 6(a), (b) and (c) show the application examples which are formed by applying changes similar in FIGS. 4(a), (b) and (c) to the pivot assembly 16 of the third embodiment of the present invention. In these application examples, to the basic embodiments (FIGS. 2 and 3), the identical operation and effects explained in FIGS. 4(a), (b) and (c) are presented.

Constituted as mentioned above, the following effects are expected. First, according to the first aspect of the present invention, without deteriorating the rotation precision it becomes possible to miniaturize, reduce the number of assembling processes and make a cost down. Accordingly, when employing the pivot assembly of the present invention as a bearing for the head stack assembly, it becomes possible to accelerate to miniaturize the magnetic memory drive mechanism such as hard disc drive mechanism.

Further, according to the second aspect of the present invention, it becomes possible to give a pressurization to single bearing disposed between the cylinder portion and the shaft and increase the rotation precision of the pivot-assembly.

Further, according to the third and fourth aspects of the present invention, it becomes possible to establish a pivot assembly having a rotation precision merely with single bearing which is necessary for a bearing for the head stack assembly.

Further, according to the fifth aspect of the present invention, it becomes possible to increase further the assembling workability and the rotation precision.

Further, according to the sixth and seventh aspect of the present invention, it becomes possible to make a cost down due to the reduction of the number of parts and carry out the tuning of the co-frequency due to changing the balance of the rigidity balance of the parts.

What is claimed is:

1. A pivot assembly comprising:
    a shaft;
    a sleeve having a cylinder portion and a closed end, the closed end having an inner surface facing the cylinder portion of the sleeve; and
    means for centering the shaft and the sleeve, said means being between an end of the shaft and the inner surface.

2. A pivot assembly according to claim 1, wherein said means for centering comprises recessed portions substantially at the center of the inner surface at the closed end of the sleeve and substantially at the center of the end of the shaft; and a ball between the recessed portions.

3. A pivot assembly according to claim 2, wherein an inner ring of the bearing is formed as a portion of the shaft.

4. A pivot assembly according to claim 2, wherein an outer ring of the bearing is formed as a portion of the sleeve.

5. A pivot assembly according to claim 2, wherein an inner diameter at the closed end of the cylinder is a little larger than the outer diameter of the shaft.

6. A pivot assembly according to claim 1, wherein the means for centering is a point contact means interposed between the shaft end and the closed end of the sleeve opposing to the shaft and substantially on the center axes of the sleeve and the shaft centers the shaft and the sleeve.

7. A pivot assembly according to claim 6, wherein an outer ring of the bearing is formed as a portion of the sleeve.

8. A pivot assembly according to claim 6, wherein an inner diameter at the closed end of the cylinder is a little larger than the outer diameter of the shaft.

9. A pivot assembly according to claim 6, wherein said point contact means comprises one recessed portion provided on either one of the closed end or the shaft end and a convex portion provided on the other end.

10. A pivot assembly according to claim 9, wherein an inner diameter at the closed end of the cylinder is a little larger than the outer diameter of the shaft.

11. A pivot assembly according to claim 9, wherein an inner ring of the bearing is formed as a portion of the shaft.

12. A pivot assembly according to claim 9, wherein an outer ring of the bearing is formed as a portion of the sleeve.

13. A pivot assembly according to claim 6, wherein an inner ring of the bearing is formed as a portion of the shaft.

14. A pivot assembly according to claim 1, wherein an inner diameter at the closed end of the cylinder is a little larger than the outer diameter of the shaft.

15. A pivot assembly according to claim 14, wherein an outer ring of the bearing is formed as a portion of the sleeve.

16. A pivot assembly according to claim 14, wherein an inner ring of the bearing is formed as a portion of the shaft.

17. A pivot assembly according to claim 1, wherein an outer ring of the bearing is formed as a portion of the sleeve.

18. A pivot assembly according to claim 1, wherein an inner ring of the bearing is formed as a portion of the shaft.

* * * * *